(12) United States Patent
Agersborg et al.

(10) Patent No.: US 11,143,787 B2
(45) Date of Patent: Oct. 12, 2021

(54) SYSTEM AND METHOD FOR MONITORING A FIELD

(71) Applicant: GRAVITUDE AS, Bergen (NO)

(72) Inventors: Remy Agersborg, Straumsgrend (NO); Bjarte Fagerås, Fana (NO); Martin Vatshelle, Kalandseidet (NO); Hugo Ruiz, Nesttun (NO); Lars Hille, Nesttun (NO); Trond Espedal, Fyllingsdalen (NO); John Even Lindgård, Harstad (NO); Louise Wedderkopp Bjerrum, Bergen (NO); Yngve Rusås, Laksevåg (NO)

(73) Assignee: GRAVITUDE AS, Bergen (NO)

( * ) Notice: Subject to any disclaimer, the term of this patent is extended or adjusted under 35 U.S.C. 154(b) by 660 days.

(21) Appl. No.: 16/063,777

(22) PCT Filed: Dec. 20, 2016

(86) PCT No.: PCT/NO2016/050262
§ 371 (c)(1),
(2) Date: Jun. 19, 2018

(87) PCT Pub. No.: WO2017/111610
PCT Pub. Date: Jun. 29, 2017

(65) Prior Publication Data
US 2020/0271822 A1    Aug. 27, 2020

(30) Foreign Application Priority Data
Dec. 24, 2015   (NO) .................................... 20151796

(51) Int. Cl.
*G01V 7/04* (2006.01)
*G01V 7/06* (2006.01)

(52) U.S. Cl.
CPC .................. *G01V 7/04* (2013.01); *G01V 7/06* (2013.01); *G01V 2210/6124* (2013.01)

(58) Field of Classification Search
CPC .... G01V 7/04; G01V 7/06; G01V 2210/6124; G01V 13/00; G01L 27/002
(Continued)

(56) References Cited

U.S. PATENT DOCUMENTS
2003/0093222 A1    5/2003   Eiken

FOREIGN PATENT DOCUMENTS
WO    2008/046833    4/2008

OTHER PUBLICATIONS
International Search Report issued in PCT/NO2016/050262, dated Mar. 17, 2017, pp. 1-2.
(Continued)

*Primary Examiner* — Robert R Raevis
(74) *Attorney, Agent, or Firm* — Jeffrey S. Melcher; Melcher Patent Law PLLC

(57) ABSTRACT

A system (100) for monitoring a field (20) under a body of water, wherein the system (100) comprises a reference station (112) and a plurality of permanent seafloor sensors (120, 121). Each permanent seafloor sensor (120, 121) is fixed relative to a seafloor (2) on or at the field (20). The seafloor sensor (120, 121) further has a nearby survey station (111) sufficiently distant to ensure that a movable sensor (122) visiting the nearby survey station (111) does not disturb measurements from the permanent seafloor sensor (120). The distance is sufficiently close to ensure that the offset (Δp, Δg) from a value provided by the permanent seafloor sensor (120) is constant or can be modelled, e.g. to account for changes in the pressure/depth relation due to changes in water density. Each seafloor sensor is associated with a unique drift function d(t) at least comprising a drift (Continued)

rate (a). Thus, each permanent seafloor (120, 121) sensor provide an output that is corrected for drift at any time between calibration surveys. The system may be used for permanent monitoring of a seafloor.

14 Claims, 2 Drawing Sheets

(58) Field of Classification Search
USPC ......... 73/382 G, 1.01, 1.37–1.39, 1.57, 1.59, 73/1.62; 701/1, 2, 11, 85, 87, 88, 94, 95, 701/98, 104
See application file for complete search history.

(56) References Cited

OTHER PUBLICATIONS

Written Opnion issued in PCT/NO2016/050262, dated Mar. 17, 2017, pp. 1-7.
Norwegian Search Report issued in Norwegian patent application No. 20151796, dated May 30, 2016, pp. 1-2.
Ruiz, H. et al [2015], Monitoring of offshore reservoirs using 4D gravimetry at the seafloor: state of the art, 77th EAGE Conference & Exhibition 2015, Extended Abstracts, Tu N101 08.
Vevatne, J. N., et al., [2012] Use of Field-wide Seafloor Time-lapse Gravity in History Matching the Mikkel Gas Condensate Field, 74th EAGE Conference & Exhibition, Extended Abstracts, F040.
Stenvold, T., et al., [2006] High-Precision relative depth and subsidence mapping from seafloor water-pressure measurements, SPE Journal Sep. 2006.
Polster, A. et al. [2009], Effective resolution and drift on Paroscientific pressure sensors derived from long-term seafloor measurements, Geochem. Geophys. Geosyst. 10:Q08008.
Mes et al., 1996.
Vasco, D. W. et al. [2000], Using surface deformation to image reservoir dynamics, Geophysics vol. 65, No. 1., p. 132-147.
Landro, M, et al. [2013], Using Permanent Arrays for Shallow Monitoring, Second EAGE Workshop on Permanent Reservoir Monitoring 2013, Th-01-02.
Zumberge, M., et al., [2012] Time-lapse Seafloor Gravity and Height Measurements or Reservoir Monitoring, Offshore Technology Conference, OTC-23701-MS.
Eiken, O., et al. [2008], Gravimetric monitoring of gas production from the Troll field, Geophysics, 73, 149-154.
Van den Beukel, A. et al. [2014], Integrated Reservoir Monitoring of the Ormen Lange field: Time lapse seismic, Time lapse gravity and seafloor deformation monitoring, The Biennial Geophysical Seminar, NPF, Kristiansand 2014.
Alnes, H. et al. [2010], Experiences on Seafloor Gravimetric and Subsidence Monitoring Above Producing Reservoirs, 72nd EAGE Conference and Exhibition, Extended Abstracts, L010.
Alnes, H et al. [2008], Monitoring gas production and C02 injection at the Sleipner field using time-lapse gravimetry, Geophysics, 73, 155-161.
Bruno, M. S. [1990], Subsidence-Induced Well Failure, SPEDE 7 (2): 148-152. SPE-20058-PA.
Biirgman, R., Chadwell, D., Seafloor Geodesy, Annu. Rev. Earth Planet. Sci. 2014. 42:509-34.
Fageraas, B. et al. [2013], Using gravity to enhance recovery, GeoExpro, 10, 62-65.
Matveeva, T. et al [2015], Real Time Caprock Integrity Monitoring Becomes Reality, 77th EAGE Conference & Exhibition 2015, Extended Abstracts, Tu N101 04.

SYSTEM AND METHOD FOR MONITORING A FIELD

FIELD OF THE INVENTION

The present invention concerns a system and a method for monitoring a field.

PRIOR AND RELATED ART

Production of hydrocarbons and depositing flue gases in an aquifer are two examples in which one fluid replaces another within a subterranean formation, in particular a geological formation under a body of water. The replacement changes the density of rock layers, and may cause a seafloor over the subterranean formation to raise or sink. For convenience, we will use the terms "field" for any such subterranean structure to be monitored and the term "subsidence" for any vertical motion of the associated seafloor due to compaction or injection.

WO patent application 2008/046833 discloses a method of detecting a lateral boundary of a compacting or expanding region in a field over a period in time and a method for producing hydrocarbons.

A good understanding of compaction processes is required for an optimal management of hydrocarbon reservoirs. Compaction depends on key properties of the reservoir like compartmentalization or pore compressibility. It acts as an energy drive for production, but it can also lead to a reduced permeability and hence to a deterioration of the performance. Seafloor subsidence is an observable effect of reservoir compaction, and is hence an important tool for In some extreme cases, seafloor subsidence can compromise the safety of the installations and even cause well failure (Bruno, 1990). A permanent, continuous, real-time monitoring of subsidence in extended seafloor areas with a precision better than 1 cm would provide clear value in vulnerable fields.

While GPS technology has been used to monitor platform subsidence to a sub-cm accuracy (Mes et al., 1996), the extension of the measurements away from platforms is a more complex problem. A method based on the spatial integration of data from a grid of tilt meters (Vasco et al., 2000) could in principle also be applied offshore (Landro et al., 2013). However, attaining a sufficient accuracy would require a dense grid of precise tilt measurements. Alternative geodesy methods, e.g. acoustic ranging, are less well suited for permanent installation in order to measure the vertical component of the seafloor deformation.

Pressure sensors are used in a variety of applications for measuring water depth, and hence to determine subsidence by a time lapse series with time lapses sufficiently large to allow measurable subsidence to occur between measurements. Current precision instruments for measuring pressure, e.g. Paroscientific sensors, have accuracies less than 0.01%, which corresponds to 14 cm for a sensor with a range of 1400 m full scale (FS), i.e. one or two orders of magnitude greater than the millimetre precision required for subsidence measurements.

Sensor drift is another limiting factor. The sensor drift is different for each particular sensor, and may be at the level of tens of centimetres per year. For example, Bürgman 2014 contains an analysis of the drift of 118 Paroscientific sensors used in continuous underwater measurements from all oceans, with time series ranging between 2 months and 9 years. The analysis indicates an average drift of 9 cm/year, with a one-sigma spread around that value of 7 cm/year (Polster et al. 2009). A solution is suggested in Bürgman 2014 would reduce drift to 1 cm/year, but involves a new, large, complex instrument with a calibration device, which has only undergone one pilot test of three months of duration. The analysis of sensor drifts in Polster et al. also shows that sensor drifts are linear and do not change with time within the statistical precision of the tests.

4D gravity measurements involve measuring gravity in a set of locations in a time lapse series is known from OTC paper 23701 (Zumberge et al.) and Tu N101 08 (Ruiz, H. et al.). The measurements may be performed on a set of concrete platforms distributed over the field to be monitored. The platforms ensure that gravity measurements are performed at the same locations within a few cm every time in the time lapse series. In particular, an ROV places a sensor frame with three gravimeters on a platform, measure for 20 minutes, then move on to the next platform and repeat the procedure. A survey is typically performed in 1-5 weeks, and may involve e.g. 100 platforms depending on the size of the field. The field is surveyed typically every second year.

4D gravity is sensitive to reservoir compaction and to changes in the mass distribution during production. A typical application is monitoring the movement of gas-water interfaces, with a typical resolution being a fraction of a metre. At the Troll field, the contact movement was detected with 4D gravity before it could be resolved with seismics (Eiken et al., 2008). At Ormen Lange, gravity has been chosen to monitor aquifer influx, which was considered to be beyond the reach of 4D seismics (Van den Beukel et al., 2014).

The following example regards the pressure measurements in a current 4D gravity-subsidence survey series in order to illustrate the problems above and present solutions.

A low pass filter remove swell and other wind-generated surface waves, but pass signals related to tide, atmospheric pressure- and other pressure related signals with longer periods. The remaining variable pressure components, i.e. tide etc. are removed from a measured seafloor pressure by subtracting either a concurrent tide gauge pressure or an interpolated value based on models of concurrent gauge pressures, as both pressures include the same variable pressure due to tide etc.

In practice, the difference between two output signals includes separate and different sensor drifts from separate pressure sensors. If the tide gauge and seafloor sensor are properly calibrated, the difference represents the depth of the seafloor sensor relative to the tide gauge.

US patent application 2003/0093222 discloses a method for performing 4D gravity-subsidence surveys. Each survey is called a "measurement series" in the US-application. While the present example regards pressure and seafloor subsidence, similar gravity measurements and sensors are part of the present invention.

Before the 4D measurements commence, survey stations fixed vertically and horizontally relative to the seafloor are established. The stations may be implemented as heavy concrete platforms allowed to settle in the seafloor sediments for several weeks or months on or at the field to be surveyed. Some of these stations, hereinafter reference stations, are located in known positions, typically outside the field and close enough to allow a movable sensor to conduct a measurement on the reference station within a few hours after conducting a similar measurement on a station exposed to subsidence.

Several calibrated tide gauges ("depth meters" in the above US-application) are deployed on stations on and at the field for the duration of a survey (a measurement series Si). The deployment is cumbersome and time-consuming to preserve calibration. For example, mechanical stress may change an instrument's drift rate, and hence render an assumption of linear sensor drift invalid. In particular, deployment of several precision instruments for use as tide gauges in each survey is expensive in terms of time and money.

The survey is divided into short sequences, e.g. in the order of hours. Each sequence may include a reference station and/or start and end on the same station, hereinafter a base station. The short duration of a sequence enables approximating the drift during the sequence to a low order. If, for example, second and higher order corrections are negligible, data obtained during a sequence starting and ending on a base station may be adjusted using linear interpolation.

At the end of the survey, a depth relative to one or more of the reference stations is computed for each station on the field. The reference stations do not move between surveys, so the subsidence is the difference between the relative depths obtained in separate surveys, e.g. conducted two years apart.

The method described above achieves an accuracy of a few mm at 1000 m absolute depth using pressure sensors with an accuracy 0.01% FS and sensor drift of order 10 cm/year.

While pressure sensors were described in the previous example, similar considerations apply to gravimeters and possibly other sensors. For example, a gravimeter on a station is affected by the mass of water and air above it, i.e. the seafloor pressure. Also, the gravimeter has a sensor drift different from other gravimeters.

To summarise, current methods for monitoring an offshore field require accurate instruments, extensive calibration and cumbersome transport to, and possibly from, a survey area on the seafloor. Thus, in addition to the desire for permanent monitoring mentioned above, there is a need to reduce operational costs associated with sensor drift and calibration. Reducing operational costs includes increasing accuracy and reliability of the calibration.

The general objective of the present invention is to resolve, or at least reduce, one or more of the shortcomings above while retaining the benefits of prior art. In accordance with the general description above, specific objectives include:

enabling permanent, or at least more frequent, monitoring of a field,
reducing the operational cost of transporting a sensor to a survey area on the seafloor.

SUMMARY OF THE INVENTION

These and other objectives are achieved by a system and a method as recited in the independent claims. Further features and benefits appear from the dependent claims.

In a first aspect, the invention concerns a system for monitoring a field under a body of water. The system comprises a reference station and is distinguished by a plurality of permanent seafloor sensors, wherein each permanent seafloor sensor:

is fixed relative to a seafloor on or at the field;
has a nearby survey station sufficiently distant to ensure that a movable sensor visiting the nearby survey station does not disturb measurements from the permanent seafloor sensor and sufficiently close to ensure that the offset from a value provided by the permanent seafloor sensor is constant or can be modelled; and
is associated with a unique drift function $d(t)$ at least comprising a drift rate.

For a pressure sensor, the criterion constant offset means that the vertical displacement of nearby station equals the vertical displacement of the permanent pressure sensor, i.e. that the relative subsidence between them is negligible. Change in water density may cause the pressure-depth relation to vary with time, so the output from the sensor may vary similarly. For a gravity sensor a similar condition applies to a constant offset gravity.

The drift rate implies at least a first order term of time, i.e. a linear function. Thus, the drift function provides a correction for sensor drift that is more accurate than a calibration value that remains constant until next calibration. Second and higher order terms are possible.

The permanent seafloor sensors are preferably deployed on a survey station, and may comprise a permanent pressure sensor and/or a permanent gravity sensor.

At least one of the permanent seafloor sensors is connected to a line providing communication with a control centre at the surface. The line may comprise a wireless link. Alternatively, the line 11 could comprise a cable. A cable could also supply power to the permanent seafloor sensor. A typical application would be to include the permanent seafloor sensors in a permanent monitoring system on the seafloor.

In a second aspect, the invention regards a method for monitoring a field under a body of water, using the system according to any preceding claim and comprising the steps of:

conducting a calibration survey using the movable sensor to obtain a calibration value d for each permanent seafloor sensor on its nearby station;
computing a calibration difference for each permanent seafloor sensor by subtracting a previous calibration value $d_{T-1}$ from the calibration value d;
updating the drift function for each permanent seafloor sensor; and
adjusting each measurement value from each permanent seafloor sensor by a value $d(t_0)$ provided by the associated drift function computed at the time $t_0$ of measurement.

The calibration survey is similar to a current periodic gravity-subsidence survey with measurements performed on nearby stations associated with the permanent seafloor sensors. The calibration survey produces a calibration value d, i.e. a pressure or gravity value, for each sensor on the nearby station. By definition, there is a constant offset between the value on the permanent seafloor sensor and its nearby station. This constant cancels when subtracting the previous calibration value $d_{T-1}$. The first order drift rate $a=(d-dT-1)/T$ where T is the time since the previous calibration value was acquired.

The step of adjusting each measurement is performed for each measurement in any other step, not necessarily at the end of a sequence of steps.

Some embodiments further comprises the step of performing a monitoring survey at least once after conducting the calibration survey, wherein the monitoring survey uses a plurality of permanent seafloor sensors communicating with a control centre at the sea surface. The monitoring survey may be performed as often as desired between calibration surveys and provide reliable results as the sensor drift of each seafloor sensor is compensated by its drift function between calibration surveys. The monitoring surveys require sensors communicating with a control centre at the surface, e.g. sensors part of a permanent monitoring system or a cap-rock integrity system. The permanent seafloor sensors may also monitor continuously.

In addition or alternatively, conducting the calibration survey includes using permanent pressure sensors as tide gauges. This include embodiments where pressure sensors in a monitoring system provide tidal data for a periodic survey and embodiments where one or more permanent pressure sensors distributed on or at the field replace one or more temporary tide gauges in a periodic survey.

In some embodiments, constant offsets from a reference station and/or a constant in a drift function may be determined.

BRIEF DESCRIPTION OF THE DRAWINGS

The invention will be further explained by means of examples and with reference to the accompanying drawings, in which.

DETAILED DESCRIPTION OF PREFERRED EMBODIMENTS

Figure 1:
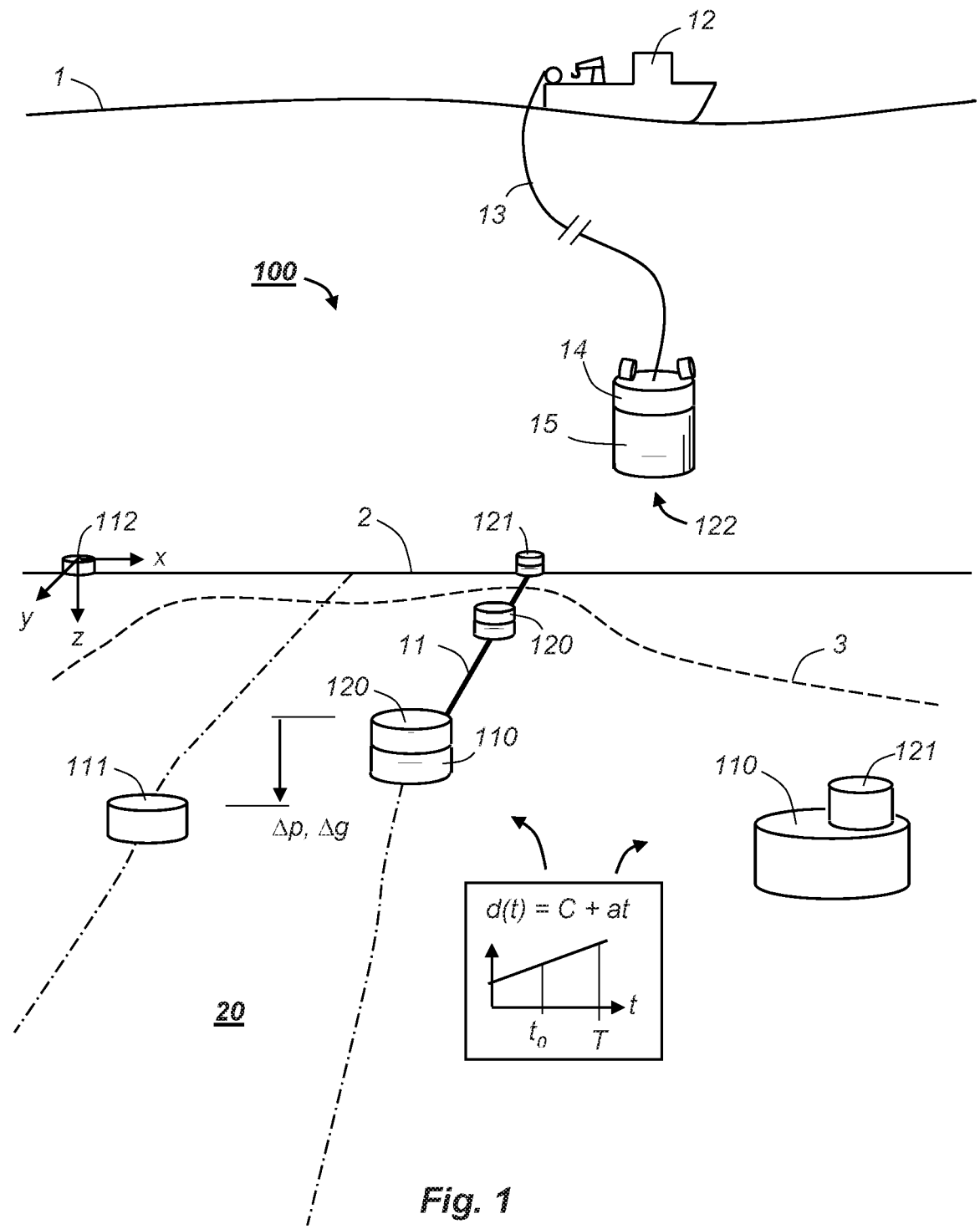
FIG. 1 illustrates a system according to the invention.

The drawings are schematic and not to scale. Numerous details known to the skilled person are omitted for clarity. Reference numeral below 100 generally illustrate the context of the invention, and are not part of the invention as such. In the claims, the articles "a", "an" and "the" means "(the) at least one", whereas explicit terms will be used in the following detailed description.

FIG. 1 illustrates a system 100 deployed on a seafloor 2. The dashed line 3 marks the boundary of a field 20. The seafloor 2 within boundary 3 is located above field 20, and represent the area on which pressure and gravity is to be measured. The seafloor 2 outside boundary 3 is located outside field 20 and represent a stable area of the seafloor 2 where vertical motion and changes in gravity due to underground density changes are negligible during the life of system 100. Areas where the vertical motion or gravity changes are predictable are also stable areas A set of survey stations 110-112 are deployed on and at the field 20, i.e. inside and outside of the boundary 3. The survey stations 110-112 do not move significantly horizontally or vertically with respect to the seafloor 2, and may comprise heavy platforms firmly settled in seafloor sediments.

Reference stations 112 are survey stations with a known position and/or gravity. For subsidence measurements, this means locations where no subsidence is expected or where the subsidence can be predicted or can be measured by external means, e.g. GPS in the case of stations placed in the proximity of a rig. For gravity measurements, a stable location is one where no changes in gravity due to underground density are expected or where such gravity changes can be predicted. In addition, the reference stations 112 should be close to the field 20 in order to reduce time and cost associated with a surface vessel 12 during a calibration survey.

A subset of the survey stations, stations 110, carry permanent seafloor sensors 120, 121. Each permanent seafloor sensor 120, 121 is deployed on the seafloor for a "long" time, e.g. a substantial part of the time from deployment to end-of-life for field 20. Each permanent seafloor sensor 120, 121 represent a sensor frame with one or more instruments for measuring pressure and/or gravity. In addition, the sensor frame will also carry any associated equipment. For example, a temperature sensor would be included for correcting measurements, a clock might be needed to time stamp data, etc.

Some seafloor sensors 120 may be part of a permanent seafloor system, e.g. a seafloor monitoring system or a caprock integrity monitoring system, as illustrated by line 11. In FIG. 1, line 11 represents a wireless or physical line to provide communication and optionally power from equipment at the sea surface 1. Accordingly, the seafloor sensors 120, 121 connected to line 11 comprise equipment for wired or wireless communication with a control centre at the sea surface 1, and may comprise means for receiving electric power. In the following, each permanent seafloor sensor 120, 121 is a generic sensor providing measurements of pressure and/or gravity. Its associated equipment is known in the art and need no further description herein.

To compensate for sensor drift, each permanent seafloor sensor 120, 121 is associated with a drift function d(t) unique to the sensor 120, 121. Specifically, each instrument measuring pressure or gravity has a unique drift function.

Each drift function d(t) provides a time dependent correction $d(t_0)$ to a measurement made at time $t_0$ which is more accurate than the correction provided by a constant calibration value d(C). The drift function d(t) illustrated in FIG. 1 is linear, and hence just comprises a constant offset C and a drift rate a. Any present and future drift function d(t) may comprise second or higher order corrections, i.e. non-zero constants b, c, etc. multiplied by $t^2$, $t^3$ etc.

In a real embodiment of the system 100, the drift function d(t) of any seafloor sensor 120, 121 may be implemented in the sensor 120, 121 or in a central control system at the surface 1. Either way, the value provided by the drift function d(t) is added to every raw datum provided by a sensor 120, 121 in the system 100. Thus, the drift function d(t) improves the accuracy of the system 100 compared to the accuracy achieved by constant calibration values d(C), e.g. performed at regular intervals T, i.e. d(0), d(T), d(2T) etc.

At a time T after calibration, one or more drift functions will provide inaccurate or unreliable corrections d(T). At that time T, a calibration survey (step 220, FIG. 2) updates the drift functions d(t). The calibration surveys use equipment and techniques known from current gravity-subsidence surveys, and may conveniently be part of a larger survey. For example, a calibration survey for seafloor sensors 120, 121 in a permanent seafloor system on part of the field 20 may be part of a periodic gravity-subsidence survey covering the entire field 20. Using the linear drift function d(t) in FIG. 1 and a depth gauge 120, 121 as example, two subsequent calibration surveys may provide a difference $d-d_{T-1}$ precise to within a millimetre independent of the time T between surveys and independent of seafloor depth. This provide a precise value for the linear drift rate $a=(d-d_{T-1})/T$ for the depth gauge, which may be deployed, for example, 1000 m or 2000 m below the sea surface 1. Similar calibration values are obtained for any permanent seafloor sensor 120, 121 measuring pressure or gravity as explained below.

During the calibration survey 220, the movable sensor 122 measures pressure and gravity on a survey station 111 for several periods of swell on the sea surface 1, e.g. for 20 minutes. In a real embodiment, the movable sensor 122 comprises several precision instruments with associated equipment and circuitry mounted in a sensor frame 15 as known from current gravity-subsidence surveying.

When the measurements on station 111 are complete, a surface vessel 12 moves the sensor frame 15 with the movable sensor 122 to a next survey station 112, where the measurements are repeated. Reference numeral 13 represent an umbilical for providing power and communication to an ROV 14.

During the calibration survey, the movable sensor 122 lands on a nearby station 111 rather than on the stations 110 with the permanent seafloor sensor 120 to avoid disturbing measurements and/or the sensor 120. The horizontal distance between the permanent seafloor sensor 120 and its nearby station 111 must be sufficiently large to avoid disturbing the permanent seafloor sensor 120 during a calibration survey, and sufficiently close to ensure that the offset $\Delta p$, $\Delta g$ from a value provided by the permanent seafloor sensor 120 is constant.

For a pressure sensor 120, a constant vertical offset $\Delta p$ means that the vertical displacement of station 111 equals the vertical displacement of the sensor 120, i.e. that the relative subsidence between them is negligible. A similar condition applies to a constant offset $\Delta g$.

The vertical offset $\Delta p$ between station 111 and sensor 120 may be significant, as long as it is constant.

A purpose of the calibration survey is to update the drift rate, i.e. $a=(d-d_{T-1})/T$ in FIG. 1, for all sensors. That is, d generally represent pressure or gravity.

In the present example, d represent depth, and the calibration includes a calibration difference $(d-d_{T-1})$ between measured values at two points in time. In general, any constant included in such differences between values at two points in time cancel by subtraction. For example, the vertical displacement of station 111 is equal to the displacement of sensor 120 due to the criterion of negligible relative subsidence. Hence, a difference between calibration values on station 111 equals the difference between the vertical positions of sensor 120 at the same two points in time.

As constant depth and gravity offsets cancel in the same manner as in a gravity-subsidence survey, there is no reason to record them for use in a time lapse series. However, in the system 100 the constants generally do not cancel. That is, the relative depth of a seafloor sensor is not the same as the relative depth of its nearby station. In some embodiments of the system, these relative depths may be recorded.

The permanent seafloor sensors 120, 121 may be used in a continuous monitoring system 11 or for a monitoring survey at any time $t_0$ between calibration surveys.

Such an application requires communication to the surface as illustrated by three sensors 120, 121 connected to line 11 in FIG. 1. The line 11 primarily represents a communication link, and may be implemented as a wireless link. Optionally, the line 11 may comprise a cable, and supply power from the surface in addition to provide communication.

The sensor 121 is a tide gauge, i.e. a pressure sensor that provides a variable pressure signal representing time continuously or during a survey. Each of the two sensors 120 connected to line 11 provide a similar variable pressure. All output signals are corrected for sensor drift by their respective drift functions, and are thus sufficiently accurate in the entire time range between two calibration surveys.

Assuming all three sensors 120, 121 connected to line 11 are affected by the same tide, the output signal from sensor 121 may be subtracted from the signals from the sensors 120 in the permanent seafloor system, thereby providing an accurate tide corrected depth of each sensor 120 relative to the tide gauge 121.

The tide gauge 121 is located outside the boundary 3, i.e. in a region with no subsidence. Hence the difference to station 112 is constant, and the depth of each sensor 120 relative to the common level z=0 can be established continuously or at any predetermined time $t_0$ between calibration surveys.

In addition or alternative to the permanent seafloor sensors 120, 121 associated with the permanent seafloor system 11, the system 100 may comprise permanent seafloor sensors 121 to replace one or more of the temporary tide gauges used in current gravity-subsidence surveys involving the vessel 12, ROV 14 and movable sensor 122.

In FIG. 1, one such permanent tide gauge 121 is shown on station 110. Similar tide gauges 121 may be distributed over and around the entire field 20 sufficiently dense to provide reliable interpolated tidal data for any survey station 110, 112 on and at the field 20. In FIG. 1, the station 110 is shown on the field 20, i.e. within boundary 3 to illustrate that the subsidence during a survey, e.g. lasting five weeks, is negligible or may be approximated by a linear interpolation function.

A landing surface on station 110 enables the ROV 14 with suitable connectors to land, e.g. to recharge batteries and activate the permanent tide gauge 121 before a periodic survey, and to download recorded data from the sensor 121 after the survey. The recorded data are corrected for sensor drift due to the unique drift function of the sensor 121.

The permanent tide gauges 121 need periodic calibration as any other permanent seafloor sensor in the system 100, and are therefore included in the calibration survey. To avoid disturbances in the data recorded by the sensor 121, each permanent tide gauge 121 is associated with a nearby station 111 as described above.

During the calibration survey, station 111 is visited at least twice. Thus, any significant subsidence can be detected for later interpolation. The calibration survey may establish the depth of tide gauge 121 relative to a suitable reference station with sub-cm accuracy as described previously. After the survey, the recorded tide data from permanent tide gauge 121 are corrected for sensor drift and may be known to be within a depth of, for example, a few mm relative to a nearby reference station. We note that these relative depths are not required for the subsidence measurements or for estimating the drift rate, as the constant offsets cancel when subtracting two values from a time lapse series.

Thus, the recorded data provided by the permanent tide gauge 121 may be comparable to the recorded data provided by the precision instrument currently in use, and may hence be used to interpolate tidal data for any station 110, 112 on and at the field 20 in a similar manner. This eliminates careful transport and deployment of at least one delicate temporary tide gauge. In addition, the present invention may permit a denser grid of less accurate, less expensive permanent tide gauges 121 on and at the field 20, thereby improving the accuracy of the interpolated tidal data.

Any permanent seafloor pressure sensor 120, 121 may provide the seafloor pressure used in tidal corrections during a periodic survey conducted by a surface vessel 12 or in a similar monitoring survey performed by means of permanent sea floor sensors 120. Hence, there is no sharp distinction between the seafloor sensors 120 and tide gauges 121.

Figure 2:
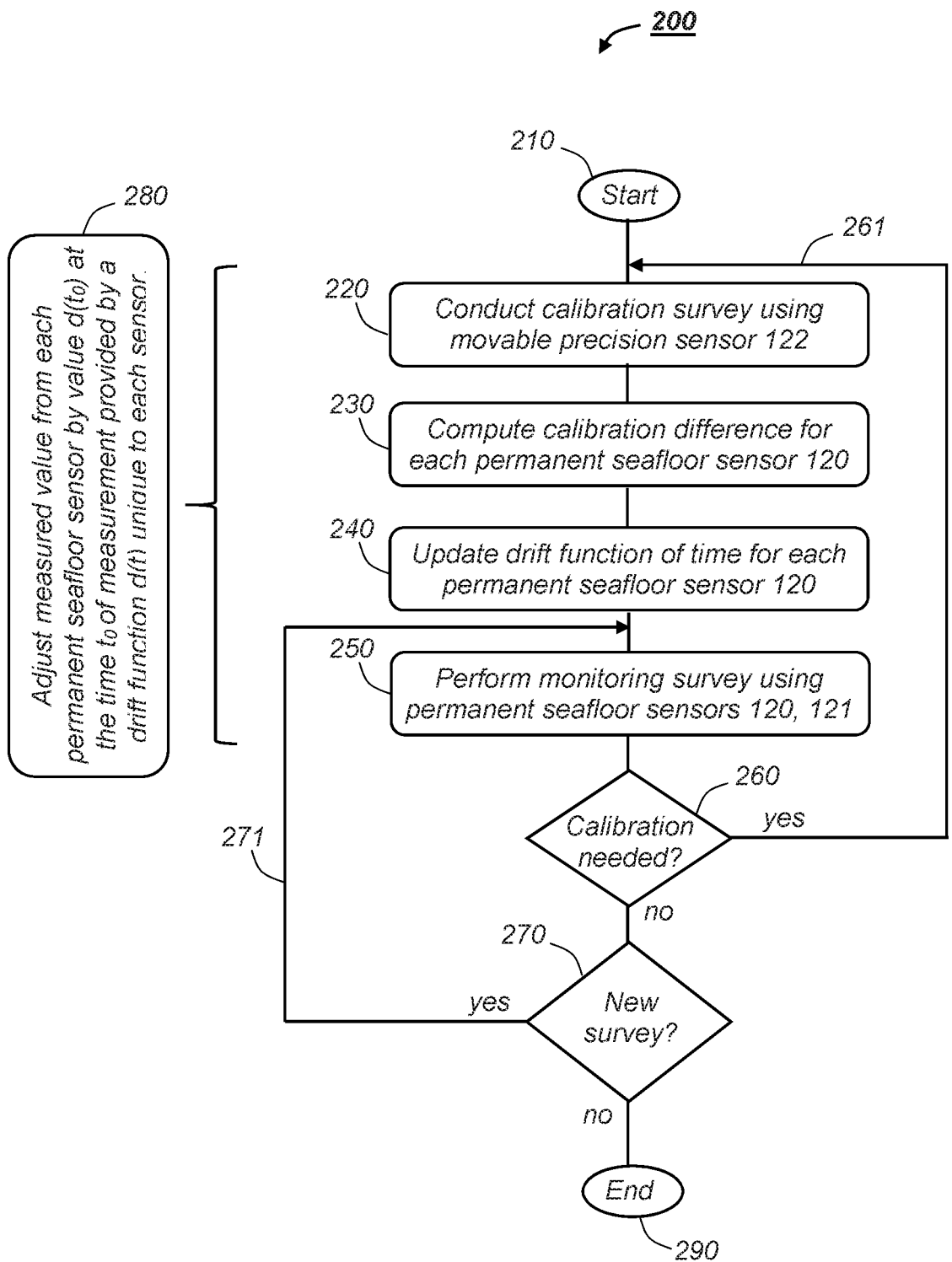
FIG. 2 illustrates a method according to the invention.

FIG. 2 is a flow diagram illustrating major steps in the method 200 according to the present invention. The loop 261 represents repeated gravity-subsidence surveys with a precision sensor 122 producing a calibration difference for each permanent sensor 120. Loop 271 represents frequent or continuous monitoring surveys between the calibration surveys. Step 280 illustrate a drift function that provides a correction to data measured by a permanent seafloor sensor 120, 121. The drift function d(t) is a function of time unique to each sensor that provides a precise correction to the output signal from the senor at any time after a calibration survey.

Step 210 includes all steps required to deploy and initialize the system 100. This may include deploying nearby survey stations 111 and recording constant offsets that are not already provided for previous periodic surveys.

The initial calibration of each permanent seafloor sensor 120, 121 may be simplified by taking the conditions at its respective station 110 or reference station 112 into account. For example, the variable pressure due to surface conditions and local currents is small compared to the pressure at absolute depths of 1000 m or more. Thus, the calibration of sensor 120 can be limited to one pressure corresponding to the intended depth of deployment, and to temperatures expected to occur on the respective survey station 110-112.

Step 220 regards a calibration survey conducted using a movable sensor 122. In some respects, the calibration survey is similar to the gravity-subsidence survey described in the introduction, and may be conducted as part of a periodic survey by the same vessel 12 and movable sensor 122. Thus, the calibration survey in step 220 is compared to the prior art survey in the following example.

Similar to a current periodic survey, the calibration survey is preferably conducted in short sequences. Each sequence may start and end on a base station, e.g. a reference station 112. Each station 111 associated with a nearby permanent seafloor sensor 120, 121 is preferably visited at least twice by the movable sensor 122, and each visit involves measuring pressure and/or gravity for e.g. 20 minutes. Variations due to tide, atmospheric pressure etc. may be removed by tidal data, e.g. computed from measurements from permanent seafloor sensors 120, 121. At the end of the calibration survey, the depth of each visited station 111 may optionally be established relative to a reference station 112.

In step 230, a calibration difference is computed for each permanent seafloor sensor 120, 121. The calibration difference is the difference $d-d_{T-1}$ between current d and previous $d_{T-1}$ calibration values obtained in subsequent calibration surveys. The calibration values d, $d_{T-1}$ correspond to the output signal from the permanent seafloor sensor, and may represent pressure or gravity.

In step 240, the computed calibration differences are used to update the drift function d(t) for each permanent seafloor sensor 120, 121. As noted in the introduction, current data indicate that the sensor drift is linear to within statistical uncertainties (Polster et al. 2009). Hence, a drift rate $a=(d-d_{T-1})/T$ may adequately describe sensor drift between calibration surveys. Preferably, the values d are recorded to enable second or higher order corrections $b \cdot t^2$, $c \cdot t^3$ etc. in case it turns out that such higher order corrections are appropriate as more data become available.

Step 250 involves performing a monitoring survey between two calibration surveys. The monitoring survey in step 240 is performed using permanent seafloor sensors 120, 121. It requires communication 11 to a control centre at the sea surface 1, but not a surface vessel 20 with associated cost of operation. Thereby, the monitoring surveys may be performed as often as desired, e.g. continuously or every few weeks or months. The techniques of low-pass filtering, transforming pressures to relative depths using tidal data from tide gauges 121 and use of reference stations 112 are similar to those employed in periodic surveys. A monitoring survey is described in a previous example.

The periodic survey 250 is optional. In an alternative embodiment, one or more permanent seafloor sensors 121 replace(s) one or more temporary tide gauges currently deployed during a gravity-subsidence survey. The two embodiments may be combined.

Step 260 determines whether a new calibration of the permanent sensors 120 is required. If the decision in step 260 is that calibration is required, loop 261 returns to a calibration survey involving a movable precision sensor 122 and a subsequent determination of a new calibration difference for each permanent sensor 120. If no calibration is needed, the method 200 proceeds to step 270.

Step 270 determines whether a new survey is required. According to previous step 260, no calibration survey 220 is required so the method 200 proceed 271 to the monitoring survey in step 250. Thus, step 270 essentially determines the frequency of the monitoring surveys 250 performed between calibration surveys 220.

Step 280 illustrates that each measurement performed by any permanent seafloor sensor 120, 121 in the system 100 is adjusted by its unique drift function d(t) at the time $t_0$ the measurement was made. Thus, the drift functions d(t) compensate for sensor drift. The drift functions may be included in the permanent seafloor sensor 120, 121 or stored in a central control system at the sea-surface 1.

At some time, e.g. at the end-of-life for the associated production and/or injection field 20, no more monitoring is needed. Then, the methods proceeds to step 290, which includes any step required to terminate the operation and/or remove parts or all of the system 100.

Major features and benefits of the present invention can be summarised as follows:

Whole-field subsidence monitoring is a well-proven technology in the Norwegian continental shelf, with many field cases demonstrating both the value of the data and that the precision obtained is at the level of a few millimetres. The present invention allows extending such a precision to a real-time monitoring system using permanent seafloor sensors 120, 121. A typical application may be integration of permanent seafloor sensors 120, 121 in a permanent reservoir monitoring system or a smaller caprock integrity system.

Periodic surveys provide a reliable drift function for each permanent seafloor sensor 120, and in addition accurate subsidence data from locations not covered by the system 100 including permanent seafloor sensors 120.

Periodic surveys will be more cost-efficient in fields 20 equipped with permanent pressure sensors 121 on the seafloor, as they may be used as tide gauges during the survey, thereby removing the need for deployment and recovery of dedicated tide gauges and hence the need for costly vessel hire.

Operational cost may be reduced even further by using suitable low cost devices in the permanent sensors. Piezoelectric MEMS-devices suitable for permanent pressure sensors 120 are already available. Inexpensive devices for permanent gravity sensors 120 may be already be available or become available in the near future.

While the invention has been described by means of examples, the scope of the invention is determined by the accompanying claims.

REFERENCES

Alnes, H. et al. [2010], Experiences on Seafloor Gravimetric and Subsidence Monitoring Above Producing Reservoirs, 72nd *EAGE Conference and Exhibition*, Extended Abstracts, L010.

Alnes, H et al. [2008], Monitoring gas production and $CO_2$ injection at the Sleipner field using time-lapse gravimetry, Geophysics, 73, 155-161.

Bruno, M. S. [1990], Subsidence-Induced Well Failure, SPEDE 7(2): 148-152. SPE-20058-PA.

Bürgman, R., Chadwell, D., Seafloor Geodesy, Annu. Rev. Earth Planet. Sci. 2014. 42:509-34.

Eiken, O., et al. [2008], Gravimetric monitoring of gas production from the Troll field, Geophysics, 73, 149-154.

Fageraas, B. et al. [2013], Using gravity to enhance recovery, GeoExpro, 10, 62-65.

Matveeva, T. et al [2015], Real Time Caprock Integrity Monitoring Becomes Reality, *77th EAGE Conference & Exhibition* 2015, *Extended Abstracts*, Tu N101 04.

Landro, M, et al. [2013], Using Permanent Arrays for Shallow Monitoring, *Second EAGE Workshop on Permanent Reservoir Monitoring* 2013, Th-01-02.

Polster, A. et al. [2009], Effective resolution and drift on Paroscientific pressure sensors derived from long-term seafloor measurements, Geochem. Geophys. Geosyst. 10:Q08008.

Ruiz, H. et al [2015], Monitoring of offshore reservoirs using 4D gravimetry at the seafloor: state of the art, *77th EAGE Conference & Exhibition* 2015, *Extended Abstracts*, Tu N101 08.

Stenvold, T., et al., [2006] *High-Precision relative depth and subsidence mapping from seafloor water-pressure measurements*, SPE Journal September 2006.

Vasco, D. W. et al. [2000], Using surface deformation to image reservoir dynamics, Geophysics Vol. 65, NO 1., P 132-147.

Van den Beukel, A. et al. [2014], Integrated Reservoir Monitoring of the Ormen Lange field: Time lapse seismic, Time lapse gravity and seafloor deformation monitoring, The Biennial Geophysical Seminar, NPF, Kristiansand 2014.

Vevatne, J. N., et al., [2012] Use of Field-wide Seafloor Time-lapse Gravity in History Matching the Mikkel Gas Condensate Field, *74th EAGE Conference & Exhibition*, Extended Abstracts, F040

Zumberge, M., et al., [2012] *Time-lapse Seafloor Gravity and Height Measurements for Reservoir Monitoring*, Offshore Technology Conference, OTC-23701-MS.

The invention claimed is:

1. A system for monitoring a field under a body of water, wherein the system comprises:
 a reference station that does not move significantly horizontally or vertically with respect to a seafloor and having a known position and/or gravity;
 a plurality of permanent seafloor sensors, wherein each permanent seafloor sensor is fixed relative to a seafloor on or at the field, and each permanent seafloor sensor is associated with a unique drift function d(t) at least comprising a drift rate (a); and
 a nearby survey station associated with the permanent seafloor sensors, the nearby survey station does not move significantly horizontally or vertically with respect to the seafloor, and the nearby survey station is sufficiently distant from the permanent seafloor sensors to ensure that a movable sensor visiting the nearby survey station does not disturb measurements from the permanent seafloor sensors and sufficiently close to the permanent seafloor sensors to ensure that the offset ($\Delta$p, $\Delta$g) from a value provided by the permanent seafloor sensors is constant or can be modeled to account for changes in the pressure/depth relation due to changes in water density, wherein the reference station and nearby survey station are utilized in calibrating the permanent seafloor sensors.

2. The system according to claim 1, further comprising a second reference station.

3. The system according to claim 1, further comprising a second nearby survey station associated with a group of the permanent seafloor sensors.

4. The system according to claim 1, wherein at least one of the permanent seafloor sensors is deployed on an associated survey station that does not move significantly horizontally or vertically with respect to a seafloor.

5. The system according to claim 1, wherein at least one of the permanent seafloor sensors comprises a permanent gravity sensor.

6. The system according to claim 1, wherein at least one of the permanent seafloor sensors communicates over a line with a control center at a surface.

7. The system according to claim 6, wherein the line supplies power to at least one of the permanent seafloor sensors.

8. A method for monitoring a field under a body of water, using a system comprising:
 a reference station that does not move significantly horizontally or vertically with respect to a seafloor and having a known position and/or gravity;
 a plurality of permanent seafloor sensors, wherein each permanent seafloor sensor is fixed relative to a seafloor on or at the field, and each permanent seafloor sensor is associated with a unique drift function d(t) at least comprising a drift rate (a); and
 a nearby survey station associated with the permanent seafloor sensors, the nearby survey station does not move significantly horizontally or vertically with respect to the seafloor, and the nearby survey station is sufficiently distant from the permanent seafloor sensors to ensure that a movable sensor visiting the nearby survey station does not disturb measurements from the permanent seafloor sensors and sufficiently close to the permanent seafloor sensors to ensure that the offset ($\Delta$p, $\Delta$q) from a value provided by the permanent seafloor sensors is constant or can be modeled to account for changes in the pressure/depth relation due to changes in water density, wherein the reference station and nearby survey station are utilized in calibrating the permanent seafloor sensors, wherein the method comprises the steps of:
 conducting a calibration survey using a movable sensor to obtain a calibration value d for each of the permanent seafloor sensors on nearby survey station;
 computing a calibration difference for each of the permanent seafloor sensors, by subtracting a previous calibration value $d_{T-1}$ from the calibration value d;
 updating the drift function for each of the permanent seafloor sensors; and
 adjusting each measurement value from each of the permanent seafloor sensors by a value d(to) provided by the associated drift function computed at the time to of measurement.

9. The method according to claim 8, further comprising the step of performing a monitoring survey at least once after conducting the calibration survey, wherein the monitoring survey uses the plurality of permanent seafloor sensors communicating with a control center at a sea surface.

10. The method according to claim 8, wherein the permanent seafloor sensors monitor continuously.

11. The method according to claim 8, wherein conducting the calibration survey includes using permanent pressure sensors as tide gauges.

12. The method according to claim 8, further comprising the step of determining constant offsets (Δp, Δg) from the reference station and/or the constant in a drift function d(t).

13. The method according to claim 8, further comprising a second reference station.

14. The method according to claim 8, further comprising a second nearby survey station associated with a group of the permanent seafloor sensors.

* * * * *